No. 676,320. Patented June 11, 1901.
G. A. JOHNSON.
WHEEL FOR HAY RAKES AND LOADERS.
(Application filed Feb. 5, 1901.)
(No Model.)
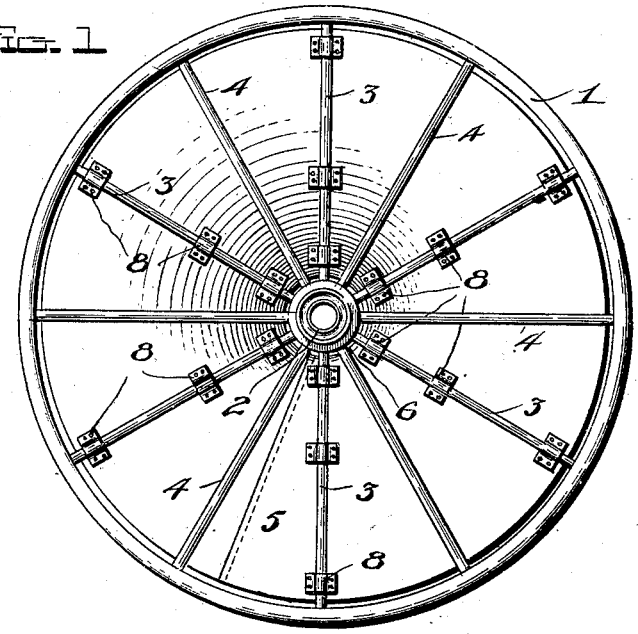
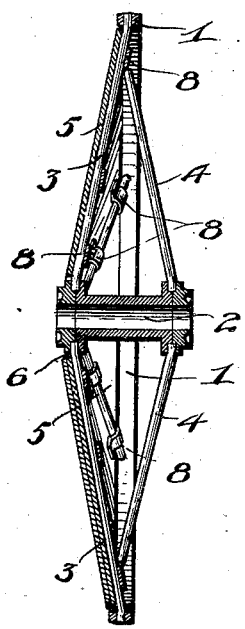
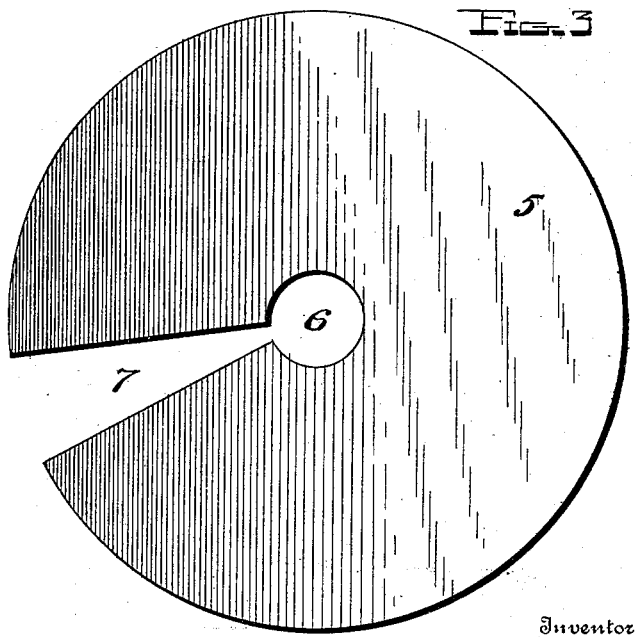
Inventor
G. A. Johnson

UNITED STATES PATENT OFFICE.

GUSTAVE A. JOHNSON, OF VERONA, NEBRASKA.

WHEEL FOR HAY RAKES AND LOADERS.

SPECIFICATION forming part of Letters Patent No. 676,320, dated June 11, 1901.

Application filed February 5, 1901. Serial No. 46,104. (No model.)

*To all whom it may concern:*

Be it known that I, GUSTAVE A. JOHNSON, a citizen of the United States, residing at Verona, in the county of Clay and State of Nebraska, have invented certain new and useful Improvements in Wheels for Hay-Rakes and Hay-Loaders; and I do declare the following to be a full, clear, and exact description of the invention, such as will enable others skilled in the art to which it appertains to make and use the same.

This invention relates to improvements in wheels for hay-rakes and hay-loaders, and particularly to a shield attachment therefor, whereby the hay is prevented from "roping" and becoming entangled with the spokes and hub of the wheel, and thus interfering with the operation of the rake or loader and with the proper formation of the windrows.

It is well known that in using the ordinary wheeled dumping-rake great inconvenience and annoyance are caused, particularly in windy weather, by strands of hay being caught up by the spokes of the wheels and formed into a ropy mass, which becomes entangled with said spokes and the hubs of the wheels, and thus interferes to a material extent with the operation of the rake and the proper deposit of the hay into windrows. This difficulty is of common occurrence, and to keep the rake in proper working order the driver is compelled to frequently leave his seat and to remove the ropy mass of hay referred to. This is objectionable for the above and other obvious reasons and causes much loss of time in keeping the wheels clear.

The object of the present invention is to provide a shield attachment for the wheels of such implements which will prevent the passage of the hay through the wheels, and thereby obviate all liability of interference with the proper operation of the implement, and which will further prevent the hay from being scattered when deposited upon the ground in windy weather.

With this and other objects in view the invention consists of certain novel features of construction, combination, and arrangement of parts, which will be hereinafter more fully described, and particularly pointed out in the appended claim.

In the accompanying drawings, Figure 1 is an outer side elevation of a wheel equipped with my invention. Fig. 2 is a central vertical section thereof. Fig. 3 is a plan view of the blank from which the shield is made.

Referring now more particularly to the drawings, wherein like reference characters designate corresponding parts throughout the several views, the numeral 1 designates the rim of a wheel of the character described, 2 the hub thereof, and 3 and 4 the inner and outer series of spokes connecting the ends of the hub with said rim.

In carrying my invention into practice I provide a shield 5, composed of a circular piece of sheet metal of a size to correspond approximately with the internal circumference of the rim 1, said shield being formed from a blank of the character shown in Fig. 3. This blank consists of a flat circular piece of sheet metal formed with a central circular opening 6 and at a suitable point with a radial slit 7, extending from the said opening through the rim or outer edge of the blank. In completing the formation of the shield from the blank shown in Fig. 3 the disk or piece of sheet metal is given a dished form and the ends of the radially-slit portion made to overlap and are soldered or riveted together. In applying the completed shield to the wheel said shield is arranged upon the inner side of the wheel, with its concave side facing outwardly and its convex side inwardly and also with its central opening arranged to receive the inner projecting flanged end of the hub of the wheel, as clearly shown in Fig. 2, the shield being of such size as to completely fill the internal space formed by the rim and to lie against the inner surface thereof and against the contiguous series of spokes 3. The shield is then secured to the wheel by means of straps 8, embracing the spokes 3 and riveted to said shield. By this construction a firm and durable connection is afforded to secure and maintain the shield firmly in position against buckling. The shield being thus arranged to close the space or opening formed by the rim, it will be obvious that no strands of hay can pass therethrough and wind about the axle and hub of the wheel and interfere with the proper motion of the rake or action of the parts in dumping the raked hay. In addition the shield will also prevent the passage of air-currents through the wheel and will thus serve to prevent the hay from being scattered in windy weather. The perfect formation of the windrows is thus insured and valuable time and labor saved.

From the foregoing description, taken in connection with the accompanying drawings, the construction, mode of operation, and advantages of my invention will be readily understood without an extended description. Changes in the form, proportion, and minor details of the construction may be made within the scope of the invention without departing from the spirit or sacrificing any of the advantages thereof.

Having thus fully described my invention, what I claim as new, and desire to secure by Letters Patent, is—

In a shield for wheels of the character described, the combination with a wheel, of a concavo-convex sheet-metal disk arranged upon the inner side of the wheel and occupying only the internal circumference of the rim with its concave side outwardly disposed, said disk being provided with overlapping ends and with an opening for the reception of the adjacent end of the wheel-hub, and fastenings securing the shield to spokes of the wheel, substantially as described.

In testimony whereof I have hereunto set my hand in presence of two subscribing witnesses.

GUSTAVE A. JOHNSON.

Witnesses:
JOHN ALBERT ASPEGREN,
CLAUD R. JOHNSON.